Oct. 25, 1966     H. E. McKELVEY ET AL     3,281,231
BENDING MOLD FOR GLASS SHEETS

Original Filed Feb. 17, 1958     3 Sheets-Sheet 1

INVENTORS
HAROLD E. McKELVEY and
THOMAS J. REESE
BY
*Oscar L. Spencer*
ATTORNEY

INVENTORS
HAROLD E. McKELVEY and
THOMAS J. REESE
BY Oscar L. Spencer
ATTORNEY

United States Patent Office 3,281,231
Patented Oct. 25, 1966

3,281,231
BENDING MOLD FOR GLASS SHEETS
Harold E. McKelvey, New Kensington, and Thomas J. Reese, Sarver, Pa., assignors to Pittsburgh Plate Glass Company, Pittsburgh, Pa. a corporation of Pennsylvania
Original application Feb. 17, 1958, Ser. No. 715,580. Divided and this application Oct. 11, 1962, Ser. No. 229,959
11 Claims. (Cl. 65—288)

This application is a division of application Serial No. 715,580, filed February 17, 1958, now abandoned.

The present invention relates to an improvement in treating glass sheets and specifically concerns an improvement in bending glass sheets to complex curvatures including a gently bent central portion merging into sharply bent flanking portions to form relatively flat extremities extending substantially normal to the central portion.

The glass bending art has developed sectionalized glass sheet bending molds for bending glass sheets to such complex curvatures. Such bending molds usually incorporate a central mold member and additional end mold members that flank the central mold member. The end mold members are rotatable relative to the central mold member into a lowered position to help support a flat glass sheet disposed horizontally and are upwardly rotatable into a closed mold position to provide with the central mold member a substantially continuous shaping surface conforming to the ultimate shape desired for the bent glass sheet.

The upper surfaces of the mold sections are concave in elevation to conform to various portions of the ultimate shape desired for the bent glass sheet. Therefore, when the end mold sections are rotated to their lowered positions, they support the flat glass sheet for bending adjacent its longitudinal extremities.

The rotatable end mold sections are counterweighted by means of counterweighted lever arms which are so constructed and arranged as to provide a moment sufficient to rotate the end mold sections upwardly when the glass sheets have softened, but insufficient to rotate an end mold section supporting a rigid glass sheet extremity. When the end mold members of prior art bending molds apply rotating forces to the tips only, the tips are subjected to bending moments throughout the bending cycle. Hence, they develop inertia, which rotates the tips beyond the positions desired for the ultimate bend.

The present invention minimizes overbending of the glass tips by providing a bending mold capable of performing a method in which the entire extremity regions outboard of the regions to be bent sharply are rotated upwardly while supported on temporary supporting means of substantially shallow curvature during the initial phase of the bending cycle. The end mold members are rotated upwardly at a more rapid angular velocity than the temporary supporting means so that toward the end of the bending cycle the end mold members take over the support of the entire extremity regions and rotate the latter into the ultimate positions desired. Therefore, the present invention minimizes the time that the extremities only of the heat-softened glass sheet are subjected to upwardly rotating bending moments, thereby minimizing tip overbending.

A bending mold according to the present invention includes temporary support means of substantially shallower curvature than the shaping surfaces of the end mold members operatively connected to the latter for upward movement therewith and including an arm extending inwardly in a horizontal plane from the outboard extremity of each end molding member when the latter is in its lowered flat glass sheet supporting position. Control means is operatively associated with each end mold member for moving the temporary support means upwardly in synchronism with upward rotation of the end mold member at a slower angular rate of upward movement than that of the end mold member about the pivot axis for the end mold member to permit the arms of the temporary support means to initially support and initially lift the end regions of the flat glass sheet and permit the end mold members to take over the support of the bending glass sheet toward the end of the bending cycle only.

The control means according to a particular embodiment of the invention comprises a pivotal connection between the outboard extremity of the arms and an end mold member and support means fixed in position relative to a carrying frame to provide sliding support for the inboard extremity of the arms. In addition, shoulders are rigidly attached to each end of the central mold member above its shaping surface to support a glass sheet for bending intermediate its ends. The end mold sections lift the glass sheet off the shoulders as the mold closes.

The present invention will be understood more clearly after studying a description of a particular embodiment which follows.

In the drawings, which form part of the present disclosure and wherein like reference numerals refer to like structural elements, FIG. 1 is a longitudinal perspective view of a bending mold employing the principles of the present invention;

Figure 1:
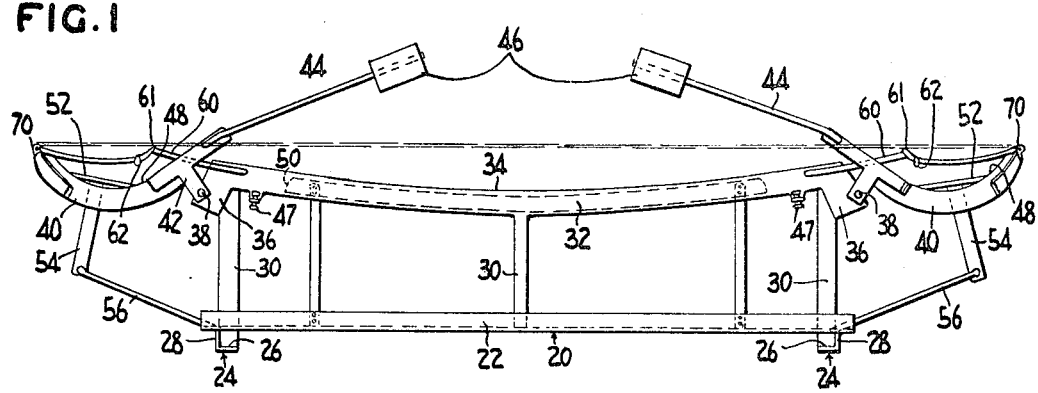

Referring to the drawings, reference number 20 refers generally to a carrying frame which comprises longitudinally extending beams 22 interconnected by transversely extending beams 24 in the form of L-shaped members having a horizontal flange 26 and a vertical flange 28. Vertical posts 30 extend upwardly from certain longitudinal beams 22 to secure rails 32 in fixed position relative to the carrying frame 20. Rails 32 are provided with upper concave shaping surfaces 34 that conform to the ultimate shape desired for the central portion of a bent glass sheet.

Pivot brackets 36 are attached to the longitudinal extremities of rails 32. The pivot brackets 36 are apertured to receive stub rods 38 which are secured to curved end mold members 40 through a T-connection 42. Lever arms 44 provided with counterweights 46 at their inboard extremities are attached to the T-connections 42. Thus, the curved end mold members 40 are rotatably mounted to flank the rails 32, and thus provide a skeletonized sectionalized bending mold of the type well known in the glass bending art.

Stop members 47 extend outwardly from rails 32. They determine the limit of rotation of the end mold members 40 about stub rods 38 in the closed mold position by engagement of the lever arms 44 therewith. The outboard molding members 40 are provided with upper concave shaping surfaces 48, so that when the counterweights 46 rotate the outboard mold members 40 about the stub rods 38, the shaping surfaces 34 of the center section rails 32 cooperate with the shaping surfaces 48 of the curved outboard mold members 40 to provide a substantially continuous skeletonized shaping surface conforming in elevation and outline to the ultimate shape desired for the bent glass sheet.

The molds may also include a heat absorbing member 50 disposed between the rails 32 of the center mold section to inhibit bending of certain central portions of the glass sheet. In this instance a fiber glass cover is employed to cover the heat absorber member 50. Additional heat absorber members 52 are rigidly secured to the carrying frame by interconnection therebetween through a vertical support rod 54 and horizontal support rods 56.

Figure 4:
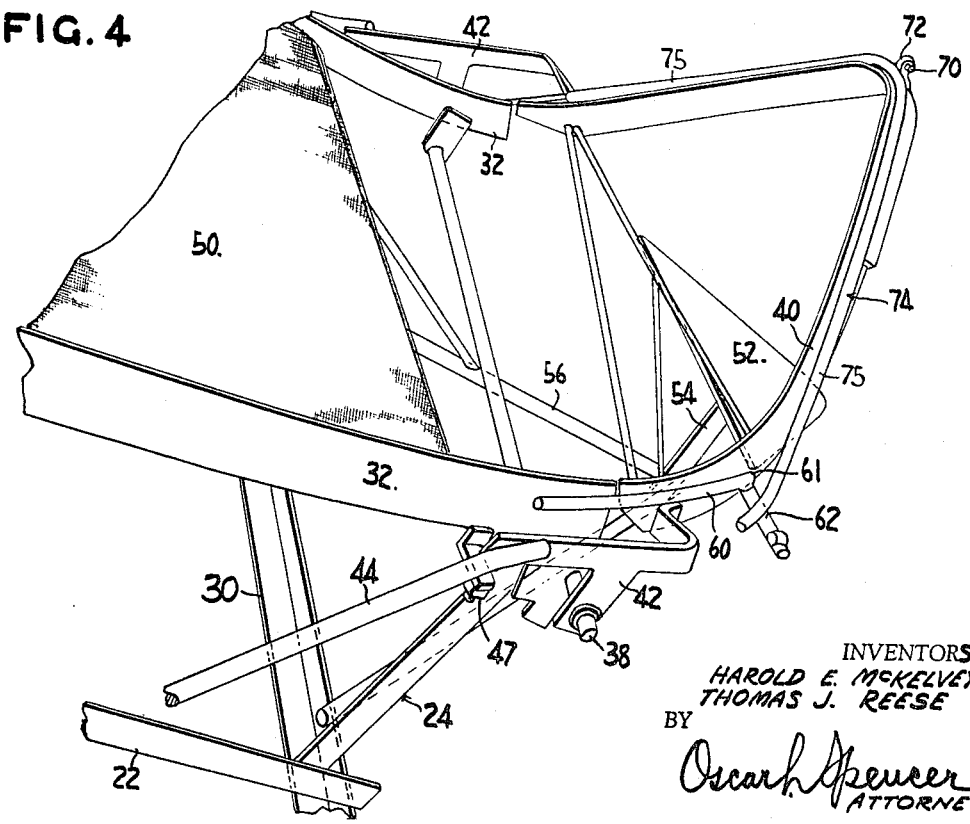
FIG. 4 is a perspective view of the end of said mold, showing the relative positions of various moving elements at the end of the bending cycle.

Extension rods 60 are attached to extend longitudinally outwardly from longitudinal extremities of center section rail 32 and each is formed with an outer shoulder 61. Angular sections 62 of the rods 60 extend laterally outwardly from end portion of extension rods 60 near the shoulders 61. Thus, the shoulders 61 are rigidly attached to the central mold section rails 32 and are located longitudinally outwardly of the central mold member in a common plane above the shaping surface of the central mold member. This common plane is the plane of support for the flat glass sheet and lies below the portion of shaping surface 48 of each end mold member 42 adjacent thereto when the latter rotates into the position it occupies at the end of the bending cycle as depicted in FIG. 4.

At the outboard extremity of the reversely curved mold members 40, a pivot bracket 70 is secured. The pivot bracket 70 includes a rotating element 72 free to rotate relative to the pivot bracket 70. Attached to the rotating element 72 is a horseshoe-shaped member 74 including arms 75 extending inwardly of the mold extremity and constructed and arranged to clear the reversely curved end mold members 40. Arms 75 have upper concave surfaces of substantially shallow curvature. They terminate at inturned tips 76 supported in sliding relation on the outwardly turned end portion 62 of an extension rod 60. The length of each arm 75 is slightly less than the distance between the outboard mold extremity to which it is pivoted and the point of sharpest curvature defined by one of the sides of the end mold member 40 for reasons to be explained later.

As seen in FIG. 1, when end mold members 40 are rotated outwardly into their lowered position for receiving a flat glass sheet, the horseshoe-shaped members 74 rotate with the end mold members and also rotate upwardly about the pivots 70 so that arms 75 extend substantially horizontally to contact the undersurface of the glass sheet extremity region along its opposite side edges to support the opposite longitudinal extremities of the flat glass sheet at spaced points outboard of the region to be subjected to severe bending. The flat sheet is also supported slightly above surfaces 34 and 48 by the shoulders 61 of the extension rods 60. The latter extend sufficiently from the longitudinal extremities of center section rails 32 to provide intermediate support points for the flat glass sheet just inboard of the axis joining the points of sharpest curvature.

The glass-laden molds are conveyed transversely through a bending lehr wherein the horizontal flanges 26 of the transversely extending beams 24 of the carrying frame 20 ride along conveyor rolls to carry the glass sheet to a region of elevated temperature sufficient to soften the flat glass sheet.

The size of the counterweights 46 and lever arms 44 is so chosen that when the mold supports a rigid sheet of flat glass ¼ inch thick, the moments of force of the rigid glass resting on the mold plus that of the end mold members 40 are greater than the rotational moments supplied by the counterweights 46 tending to rotate the end mold members 40 about the stub rods 38. However, when the glass sheet is softened by heat, the counterweights 46 cause the end mold members 40 to rotate upwardly toward the closed mold position.

Figure 2:
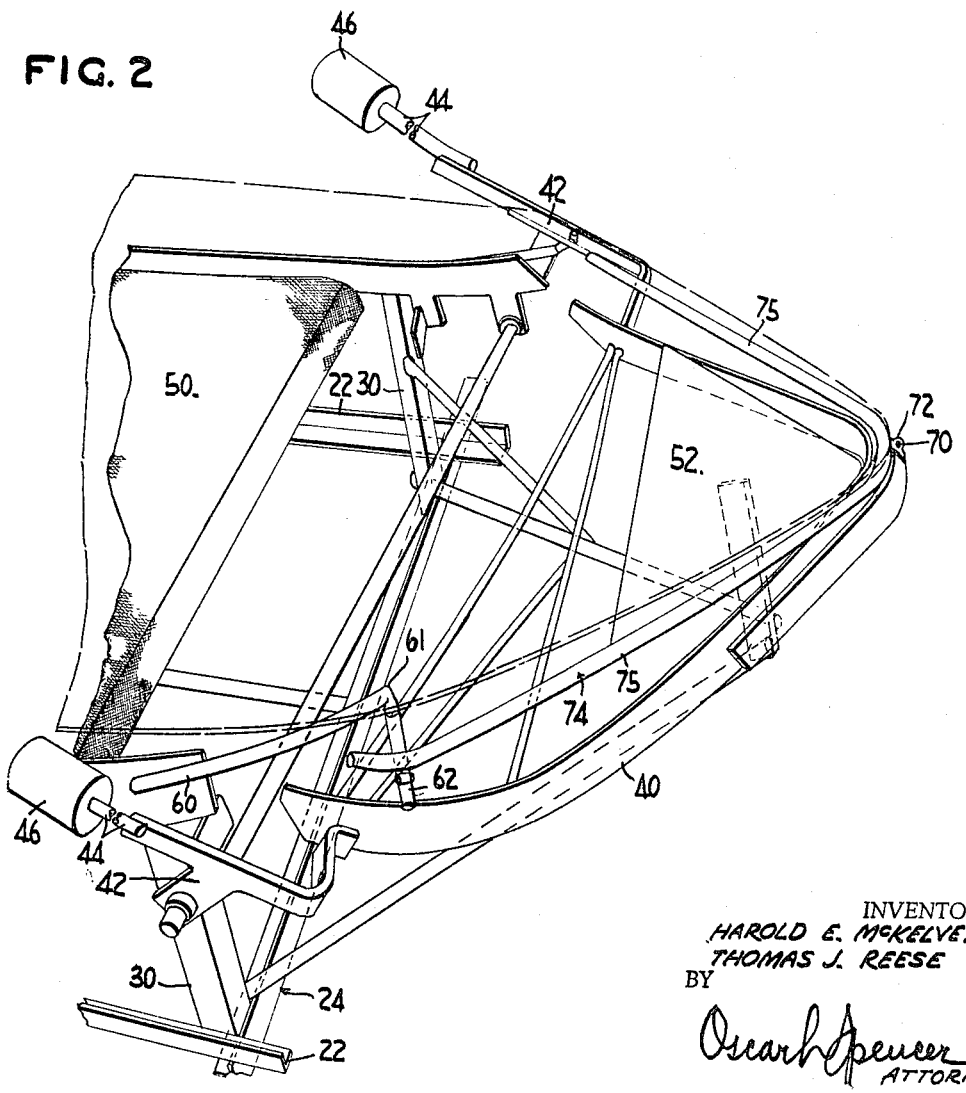
FIG. 2 is an enlarged perspective view of one end of the bending mold of FIG. 1 showing the position of the various structural elements in the open mold position.
Figure 3:
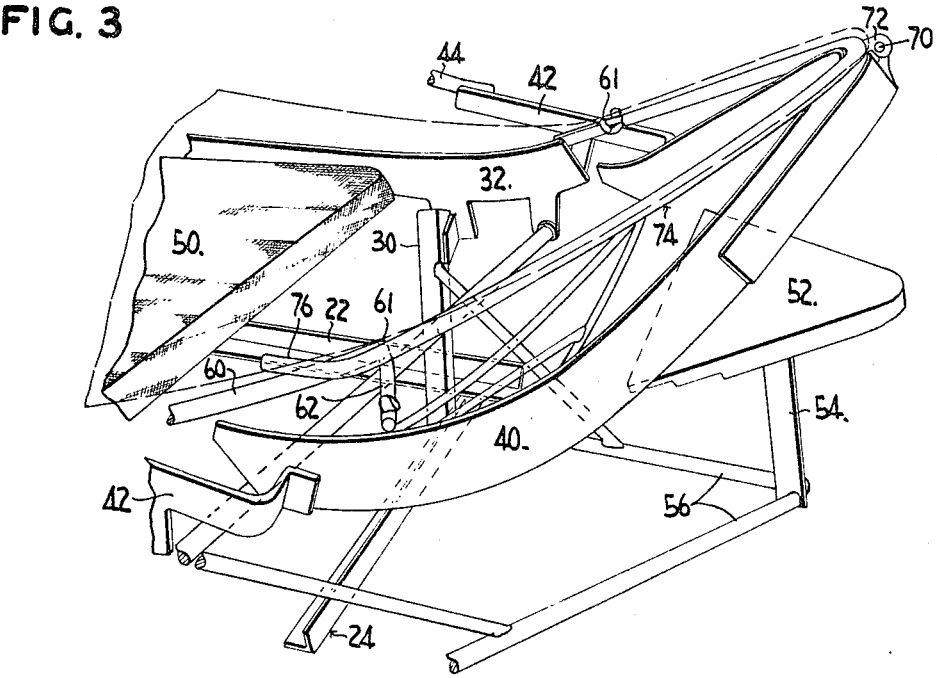
FIG. 3 is a perspective view partly in elevation showing the relative positions of various moving elements of said bending mold during an intermediate phase of the bending cycle.

As each end mold member 40 rotates upwardly, its pivotally attached horseshoe-shaped member 74 pivots about pivot bracket 70 and its inturned tips 76 slide relative to the outwardly turned extremities 62 of the extension rod 60. The net effect is to cause the arms 75 of the horseshoe-shaped member 74 to rise and lift substantially the entire length of the heat-softened glass sheet extremity region outboard of the intermediate support points provided by the shoulders 61 of the extension rods 60 along its opposite side edges. Thus, as shown in FIG. 3, instead of applying a lifting force to the glass sheet tip only at the beginning of the bending cycle as in prior art structures, upon upward rotation of end mold members 40, the lifting force is applied through the arms 75, which provide a temporary support means for a relatively large length of the glass sheet for a relatively large part of the bending cycle before the supported extremity regions contact the end mold sections 40 inwardly of their longitudinal extremities, such as depicted in FIGS. 2 and 3. This construction minimizes overbending of the tips of the glass sheet and causes the glass sheet to begin to fold upwardly in the regions desired for the sharpest bend.

Toward the end of the bending cycle, since the rate of upward movement of the end mold members 40 is more rapid than that of the arms 75, by virtue of the control means provided by the pivotal connection 70 between the arms 75 and the longitudinally outer extremity of the end mold members 40 at the outboard extremity of each arm and the sliding support for the tips 76 on the extremities 62, the temporary support provided by arms 75 is gradually terminated and the end molding member takes over the shaping of the glass sheet extremity. The horseshoe-shaped members 75 continue to rise as the end mold members 40 take over the glass shaping operation, but because their upward motion is partly counterbalanced by a counterrotation about pivots 70, the arms 75 move into nesting relation to the outboard extremities of the end mold sections 40 and thus behave as heat absorbers, tending to retard the heat softening of the glass sheet tips.

The end mold members 40 complete their rotation into the closed mold position depicted in FIG. 4 when the lever arms 44 have contacted the stop members 47. The bending apparatus of the present invention performs a method of bending comprising supporting a glass sheet adjacent an extremity thereof, heating the sheet to bending temperature and after the sheet reaches bending temperature, lifting and bending the sheet extremity by engaging the sheet inwardly of the point of support to lift the sheet above the support point. The sheet is also supported intermediate its opposite extremities slightly above the shaping surface 48, 34, 48 on fixed support points 61 and the end mold members 40 lift the glass sheet off the fixed support points 61 during bending of a sheet extremity region as shown in FIG. 4.

The temporary support arms 75 are constructed of such a length that their inboard extremities 76 terminate slightly outboard of the axis formed by connecting the points of most severe curvature desired for the bent sheet. If a cylindrical bend of non-uniform curvature is desired, the temporary support arms 75 terminate at equal distances from the longitudinal mold extremity measured along an axis parallel to the longitudinal axis of the mold. Thus, when the glass sheet softens, the spaced temporary support arms 75 initially lift the opposite side edges of each of the supported extremities of the glass sheet about an axis that is located longitudinally inwardly of each supported extremity and that extends normal to the longitudinal mold axis.

When the glass sheet is to be shaped into a conical bend, it is preferable to start to fold the glass sheet extremities upwardly about axes extending obliquely of the longitudinal mold axis. Such initial folding is facilitated by constructing the temporary glass sheet support arms 75 of a horseshoe-shaped member 74 of different lengths. The heat-softened glass, being supported at its undersurface along the opposite side edges of its extremities along arms of unequal length, will tend to begin to fold upwardly about axes slightly longitudinally inwardly of and extending substantially parallel to the lines interconnecting the inboard extremities of the spaced arms 75 of horseshoe-shaped members 74.

Figure 5:
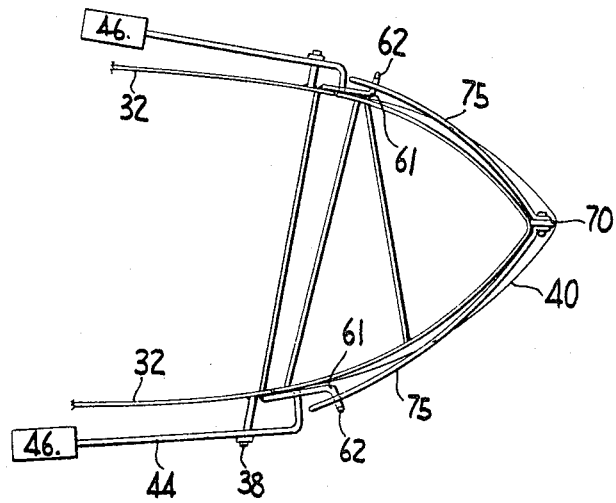
FIG. 5 is a plan view of one end of a bending mold employing an alternate embodiment of the present invention, with elements not essential to the present invention omitted for the purpose of clarity.

To impart a twist to the glass extremities, the arms 75 of the horseshoe-shaped member 74 may be made individually and independently pivotable about pivot member 70 as shown in FIG. 5. Each arm 75 and outwardly extending end portion 62 of each extension rod 60 is so constructed and arranged that as the arms 75 slide along end portions 62, they rotate at different rates about pivot 70, thus imparing an upward lifting force of different magnitudes to the opposite side edges extending longitudinally inwardly of the tips of the glass sheets. This causes the glass sheet tips to twist relative to the main central portion of the sheet early in the bending cycle along axes corresponding to those desired for the ultimate bend. At the end of the bending cycle, the end molding members support the upwardly folded twisted extremities and impress their shaping surfaces thereon.

The opposite glass sheet extremity regions are progressively engaged inwardly of the longitudinal extremities along the opposite side edges thereof by arms 75 to impart the twist as the mold moves into the closed mold position in response to the softening of the glass sheet. The pivoting of the arms 75 at different rotational velocities lifts the opposite side edges of the extremity regions at different rates, and results in a transverse engagement of the sheet extremity regions to twist the latter.

Thus, the arms 75, by providing temporary support for the flat sheet, insure that bending commences inboard of the supported portion. By controlling the relative rates of upward movement of the temporary support means and the end mold members, the fingers provide upward lifting forces only at the start of the bending cycle and until the end molding members take over toward the end of the bending cycle.

This temporary support of the glass sheet extremity regions on arms 75 before the supported extremity regions contact the end mold sections 40 inwardly of the longitudinal extremities of the glass sheet controls the sagging of the entire supported length for a longer portion of the bending cycle than was accomplished by the prior art and thus results in better control of the bend than was possible with prior art techniques.

The description of a particular embodiment and certain modifications has been for the purpose of illustration rather than limitation. The latter may be derived from the accompanying claims.

What is claimed is:

1. A skeleton type mold for supporting glass sheets during bending, comprising a center section and end sections movably connected thereto, each of said sections being provided with shaping rail portions, means for supporting the mold sections so that they are movable to an open position to receive glass sheets to be bent and to a closed position in which said shaping rail portions are aligned to provide a substantially continuous shaping surface conforming in elevation and plan outline to the shape desired for the bent glass sheets, an auxiliary shaping rail operable to support said glass sheets during movement of said mold sections from said open position to said closed position, said auxiliary shaping rail being substantially geometrically similar in plan to the shaping rail portion of one of said end sections and curved in elevation similarly to said shaping rail portion of said one end section but having a radius of curvature in elevation intermediate that of an essentially straight line and that of the shaping rail portion of said one end section, and means mounting said auxiliary shaping rail on said mold for pivotal movement outwardly of and in close proximity to the shaping rail portion of said one end section, said mounting means being effective to enable movement of said auxiliary shaping rail from a first position wherein said auxiliary shaping rail is above said shaping rail portion of said one end section and said mold sections are in said open position to a second position wherein said auxiliary shaping rail is beneath said shaping rail portion of said one end section and said mold sections are in the closed position.

2. A glass sheet bending mold for bending glass sheets into a shape comprising a gently bent central portion merging into sharply bent flanking portions to form relatively flat extremities comprising a carrying frame, an elongated central mold member having an upper shaping surface of concave elevation fixed in position relative to said frame, end molding members, each having an upper surface of concave elevation including a sharply bent portion beyond the longitudinal extremity of central mold member, pivot means fixed in position relative to said carrying frame, said end mold members being pivotable about said pivot means for rotation relative to said central mold member between a lowered position to support a glass sheet prior to bending and a raised position wherein the upper surfaces of said end mold members and said central mold member provide a substantially continuous shaping surface conforming in elevation and outline to the ultimate shape desired for the bent glass sheet, temporary support means including a pair of arms extending longitudinally inwardly in planes adjacent each side of each end mold member from the outboard extremity of each end mold member slightly less than the distance from the mold extremity to the sharply bent portion of said end mold member, actuating means operatively associated with each end mold member for rotating the latter upwardly into its raised position and control means comprising a pivotal connection between the longitudinally outboard extremity of said arm and the longitudinally outer extremity of an end mold member and support means fixed in position relative to said carrying frame and slidably supporting the longitudinally inner portion of said arm, for moving the temporary support means upwardly in synchronism with upward rotation of said end mold member at a slower rate of upward angular movement than that of said end mold member about an axis defined by the pivot means for said end mold member, whereby, when a flat glass sheet is mounted on the mold for bending, its end regions are initially supported and initially lifted on the temporary support means and, toward the end of the bending cycle only, the bend is completed by upward rotation of the end mold members contacting said regions.

3. The invention according to claim 2, wherein each arm of said pair of arms has an upper surface of substantially shallower curvature than the shaping surface of said adjacent end mold member.

4. The invention according to claim 3, wherein said arms extend longitudinally inwardly in a substantially horizontal plane from the end molding members laterally outboard of the latter and above their shaping surface when the latter are in their lowered position and embrace the end mold members below their shaping surfaces when the latter are in their raised position.

5. The invention according to claim 3, wherein said arms are of unequal length.

6. The invention according to claim 3, wherein said arms are independently and individually pivotally mounted to each end mold member at their outboard extremities.

7. A mold as in claim 2, further including a heat absorbing member located below said upper edge surface and positioned within a plane projected by said central mold member to face a portion of a glass sheet mounted on said mold for bending, said heat absorbing member having a cover of fibrous glass material disposed thereover in facing relation with said portion of said supported glass sheet.

8. The invention according to claim 2, further including intermediate support means comprising shoulders rigidly attached to said central mold member and located adjacent each end mold member longitudinally outwardly of said center mold member in a common plane above the shaping surface of said central mold member.

9. A mold as in claim 8, further including a heat absorbing member located below said upper edge surface and positioned within a plane projected by said central mold member to face a portion of a glass sheet mounted on said mold for bending, said heat absorbing member having a cover of fibrous glass material disposed thereover in facing relation with said portion of said supported glass sheet.

10. A mold for bending glass sheets comprising a central mold member having an upper surface of concave elevation, end mold members each having an upper surface of concave elevation and an outboard longitudinal extremity, intermediate support shoulders rigidly attached to said central mold member and located adjacent each end mold member longitudinally outward of said central mold member in a common plane above said shaping surface of said central mold member, each said shoulder providing single point support for a flat glass sheet mounted on said mold for bending, and means pivotally connecting said end mold members to said central mold member for rotation between a lowered mold position wherein said outboard longitudinal extremities occupy positions in said common plane and a raised position wherein said end mold members are in substantially end-to-end relation with said central mold member to provide a substantially continuous shaping surface conforming to the shape desired for the bent glass.

11. A mold as in claim 10, further including stop members operatively connected to said end mold members in the raised mold position to support said end mold members in a position such that the portions of their shaping surfaces adjacent said shoulders are located above said shoulders.

References Cited by the Examiner
UNITED STATES PATENTS

| | | | |
|---|---|---|---|
| 760,959 | 5/1904 | Connington | 65—158 |
| 2,695,476 | 11/1954 | Jendrisak | 65—290 |
| 2,720,729 | 10/1955 | Rugg | 65—288 |
| 2,737,758 | 3/1956 | Jendrisak | 65—290 |
| 2,774,189 | 12/1956 | Jendrisak | 65—290 |
| 2,917,872 | 12/1959 | Golightly | 65—288 |
| 2,924,045 | 2/1960 | Startzell | 65—288 |
| 3,137,558 | 6/1964 | Oberstar | 65—288 |

FOREIGN PATENTS

| | | |
|---|---|---|
| 1,089,973 | 3/1955 | France. |

DONALL H. SYLVESTER, *Primary Examiner.*

ARTHUR P. KENT, JAMES S. BAILEY, F. W. MIGA,
*Assistant Examiners.*